TELEGRAPH HUB REPEATER

Filed Dec. 29, 1948 3 Sheets-Sheet 1

INVENTORS: J. R. DAVEY
W. T. REA
BY John E. Cassidy
ATTORNEY

Aug. 26, 1952 J. R. DAVEY ET AL 2,608,619

TELEGRAPH HUB REPEATER

Filed Dec. 29, 1948 3 Sheets-Sheet 2

INVENTORS: J. R. DAVEY
W. T. REA

BY John E. Cassidy

ATTORNEY

INVENTORS: J. R. DAVEY
W. T. REA
BY John E. Cassidy
ATTORNEY

Patented Aug. 26, 1952

2,608,619

UNITED STATES PATENT OFFICE 2,608,619

TELEGRAPH HUB REPEATER

James R. Davey, New York, and Wilton T. Rea, Manhasset, N. Y., assignors to Bell Telephone Laboratories, Incorporated, New York, N. Y., a corporation of New York Application December 29, 1948, Serial No. 67,996

6 Claims. (Cl. 178—73)

Figure 1:
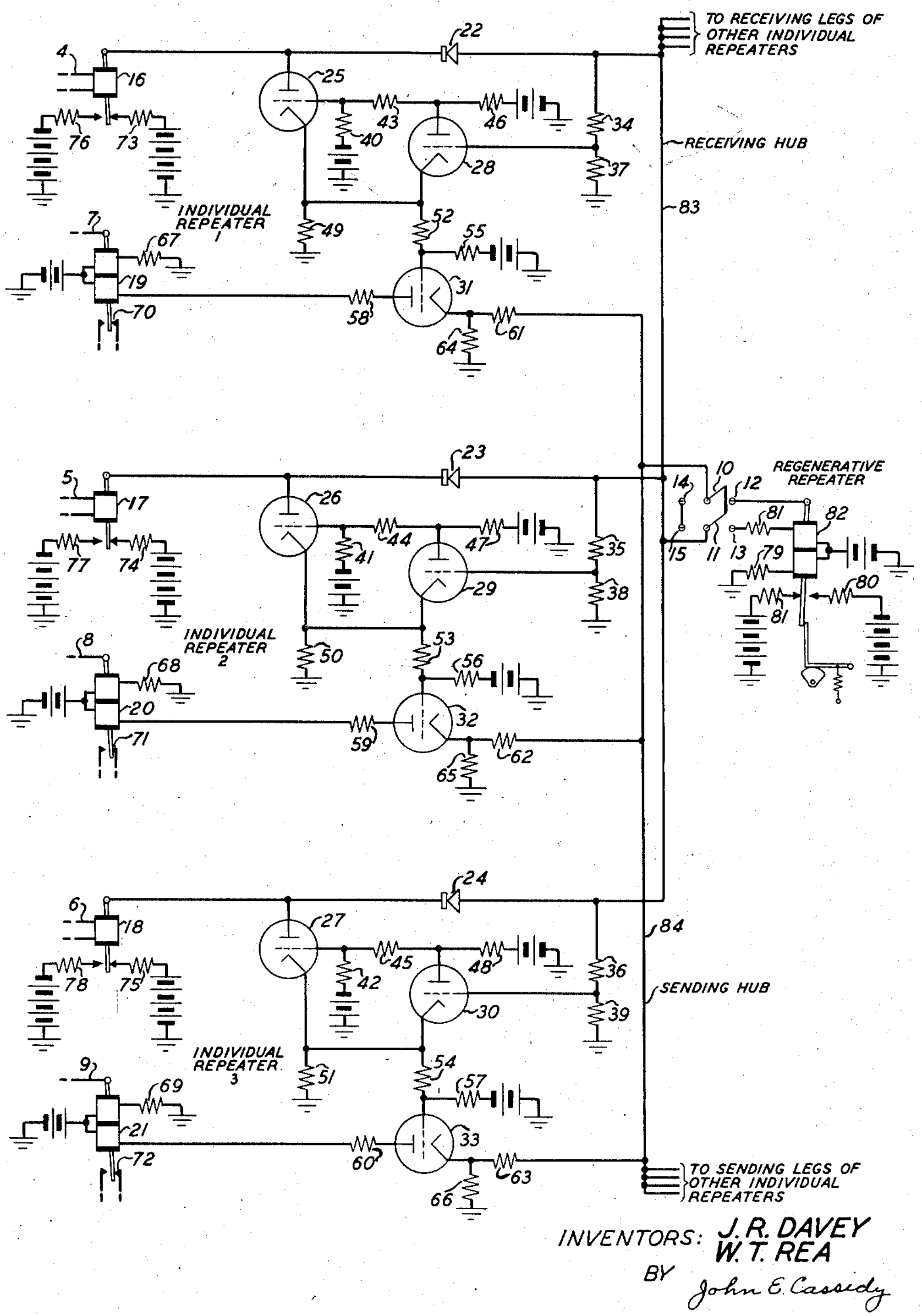

This invention is an improved hub-type telegraph repeater. Hub-type telegraph repeaters are well known in the art, being described, for instance, in Patents 2,056,277 issued to F. S. Kinkead et al. October 3, 1936, 2,069,224 issued to G. C. Cummings February 2, 1937 and 2,337,496 issued to W. T. Rea December 21, 1943. The present improvement consists in the incorporation into the repeater of electronic means to perform various functions heretofore performed by electromagnetic relays and consists particularly in an electronic control circuit to control transmission in the sending leg of the repeater dependent on conditions imposed on the receiving leg of the repeater and on the hub.

When electromagnetic relays are employed in the control circuit of a hub-type repeater, it has been found desirable, even when a regenerator is not required for reshaping and retiming attenuated and distorted signals, to employ an electromagnetic relay repeating device to interconnect the receiving and sending hubs. One of the reasons which dictates the employment of this device for this purpose is the necessity for introducing a delay before signals are impressed on the sending legs of the individual repeaters connected to the hub, so as to insure that the electromagnetic elements in the control circuits interconnecting the receiving and sending hubs will have sufficient time to operate so as to perform their control functions, that is, to either lock the sending leg of the home individual repeater against resending its own signals, or to unlock it if it has been locked and, when required, to transmit signals incoming from another repeater. When electronic devices are employed to perform these functions their operation is so fast that it is not necessary to employ the electromagnetic relay repeater as it is not necessary to introduce a delay. A repeating device is employed between the receiving and sending hubs of an electronic hub repeater only at certain hub concentration points in a widespread network when it is necessary to reshape and retime the signals and for this purpose a regenerative repeater which may be electromagnetic, but preferably is electronic, is employed. There is an obvious saving as a result of the elimination of the ordinary electromagnetic repeating relay between the receiving and sending hub both in first cost and maintenance expense, but, and what is more important, the elimination of the extra electromagnetic repeating device at most of the hubs in a large network improves signal quality by eliminating the distortion and bias inevitable even in the best electromagnetic repeating relays. Further, it eliminates a source of trouble which each electromagnetic relay represents and improves the reliability of the network.

The introduction of electronic devices also in the sending and receiving legs of the present repeaters cuts down the current which is required to be passed through the contacts of the electromagnetic receiving relays in each individual repeater and through the contacts of the regenerator when an electromagnetic regenerator is employed, thus increasing the number of individual repeaters which may be interconnected through a hub and greatly reducing contact troubles caused in existing hub-type repeaters by the breaking of contacts carrying relatively heavy current.

A feature of the present invention is a hub-type telegraph repeater having an electronic control circuit.

A further feature of the present invention is a hub-type telegraph repeater having an electronic control circuit which includes a multivibrator or flip-flop electronic device to discriminate between various transmission conditions impressed on the receiving leg of an individual repeater and on the hub so as to properly control transmission through the various sending legs of the individual repeaters connected to the hub.

A further feature of the invention is an electronic device in the sending leg of the individual repeaters which is controlled mutually by conditions impressed on the device by the control circuit and by the hub.

A further feature of the invention is a rectifier blocking device in the receiving leg of each individual repeater connected to the hub, which aids in the control of potentials applied to the electronic control circuit interconnecting the receiving and sending legs, in that it keeps conditions in the receiving leg independent of those on the hub but not vice versa.

A further feature of the invention is a double space by-pass arrangement incorporated in the electronic control circuit of an individual repeater through potential discriminating means in the control circuit thus eliminating the need for a separate double space by-pass circuit as presently known in the art. As arranged herein the double space by-pass feature effects the transmission of mutilated signals to all parties connected to the network including the simultaneously sending parties as an indication of an abnormal condition, thus serving as a supervisory signal.

In the circuit of the present invention only two leads are required to connect each individual repeater to the hub. Notwithstanding this, it is possible over these two leads, to perform all of the functions required to be performed by the leads interconnecting individual repeaters to hubs. In certain of these circuits as many as five leads have heretofore been necessary. The functions performed by the two leads interconnecting each of the individual repeaters to the hub in this invention are:

1. The parallel interconnection of each of a multiplicity of half-duplex legs to the hub;
2. Transmission toward the hub over one of the two legs and from the hub over the other;
3. Directional control of transmission to prevent the reflection of incoming signals;
4. The double space by-pass function;
5. Multiway regeneration by means of a one-way regenerator unit.

Attention is also called to the fact that by connecting the two leads together locally at the control circuit and extending them to the switchboard as a single lead all of the foregoing functions except the fifth may be exercised.

A further feature of the invention therefore is an individual repeater which may be interconnected to a hub by means of two leads only and all of the functions required of the various leads interconnecting individual repeaters to hubs, including double space by-pass may be performed by means of but two leads.

Since the double space by-pass feature is included in each individual leg, full-duplex operation between two facilities may be attained by means of the double space by-pass feature.

These and other features of the invention will be made apparent from the following description when read with reference to the associated drawings which show four hub circuits with electronic controls each of which includes a multivibrator or flip-flop circuit as the essential control element. It is to be understood that the invention is not limited to incorporation in embodiments disclosed herein but may be incorporated in other embodiments which will readily be suggested to those skilled in the art by the present disclosure.

Figure 2:
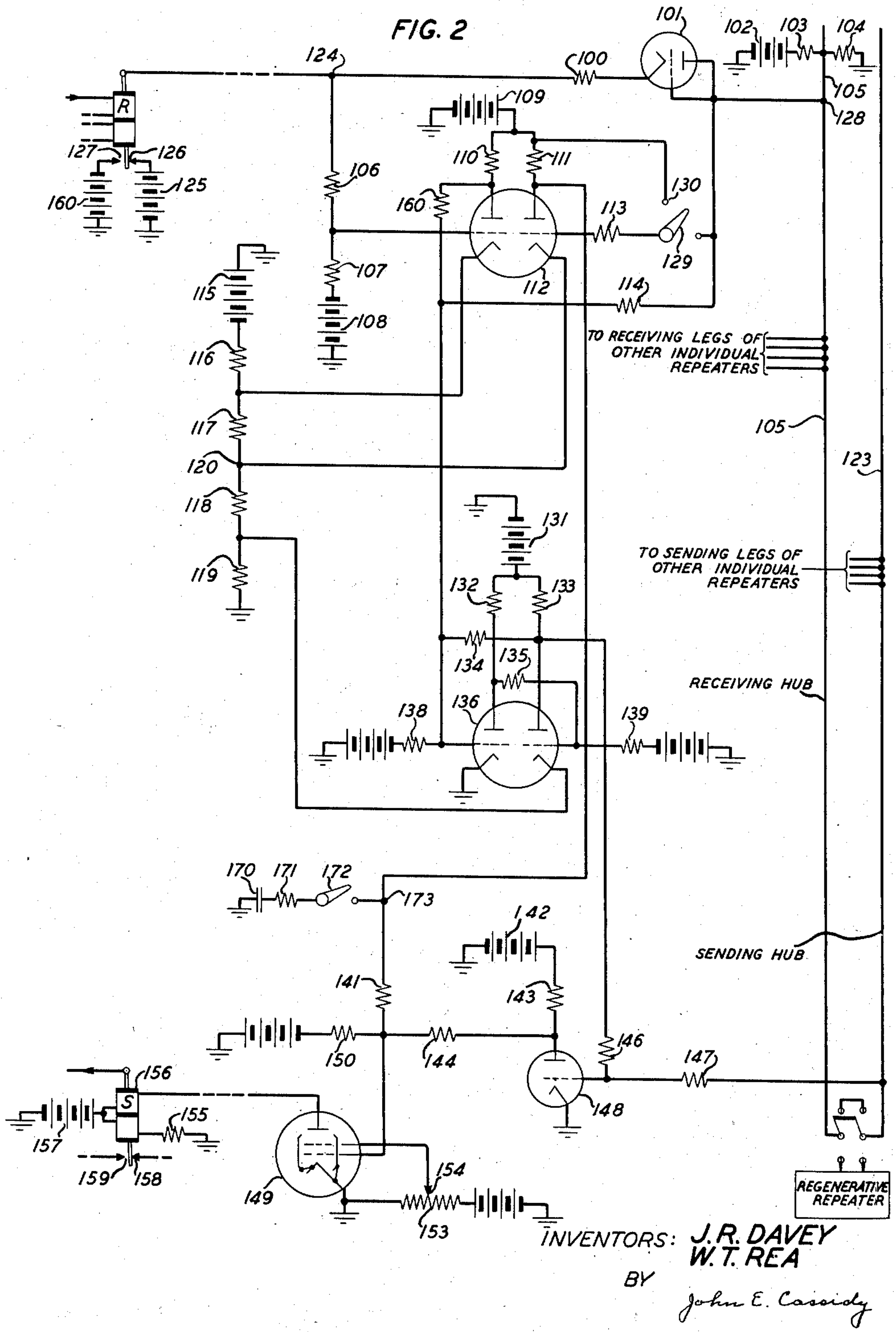
Figure 3:
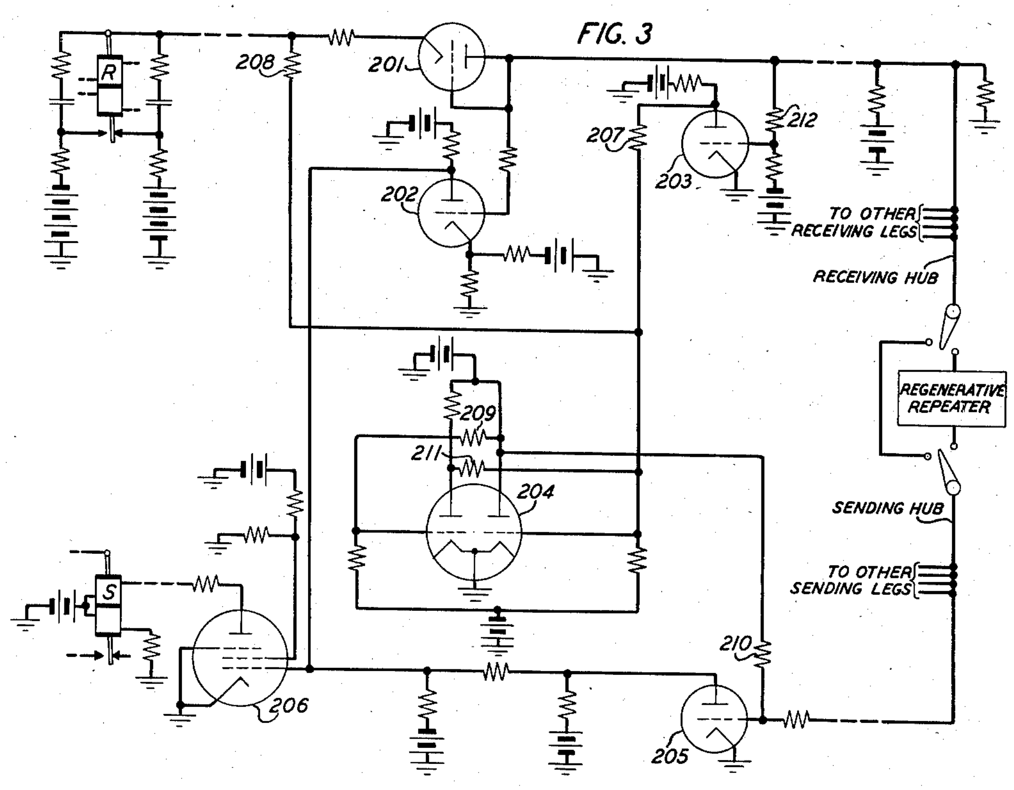
Figure 4:
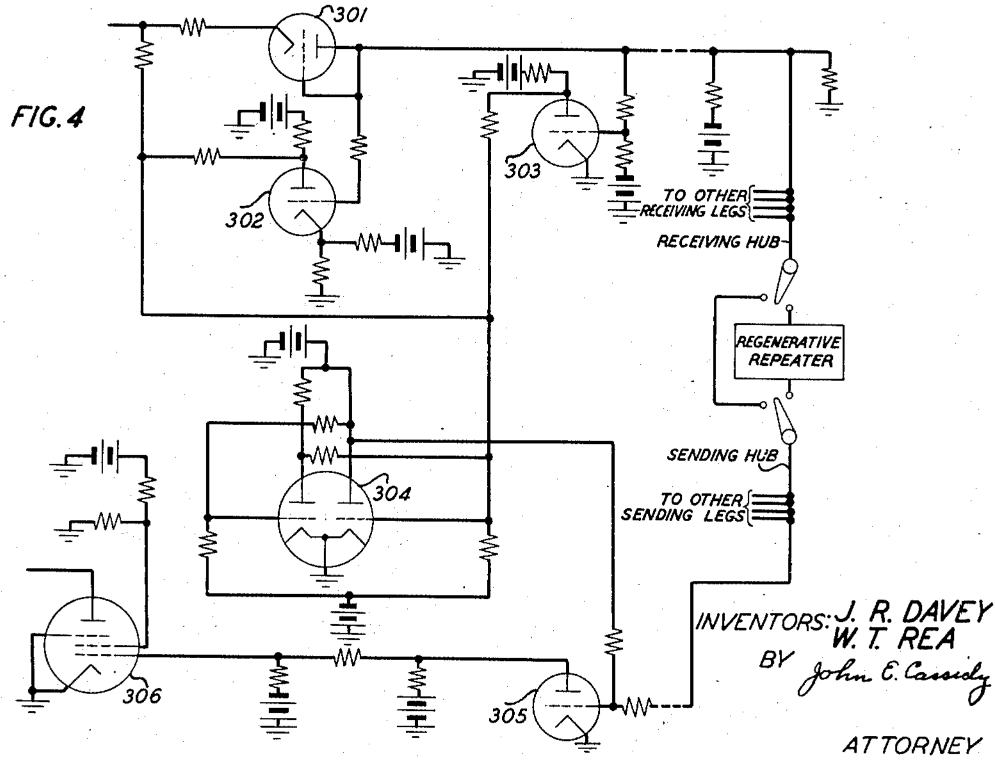

In the drawings:

Fig. 1 is an electronic hub repeater circuit having a rectifier in the form of a varistor blocking the receiving leg and having a control circuit in which space discharge devices are arranged as a flip-flop circuit to control transmission in the sending leg of the repeater; and Figs. 2, 3 and 4 are electronic hub repeater circuits each having a space discharge rectifying device serving as the blocking device in the receiving leg, and having a control circuit in which space discharge devices are arranged as a flip-flop circuit which controls transmission in the sending leg of the repeater and in which other space discharge devices are arranged to provide a double space by-pass feature.

Refer now to Fig. 1 which shows three individual hub-type repeaters, repeaters 1, 2 and 3 interconnected through a hub. More than three individual repeaters will ordinarily be so interconnected. Each individual repeater comprises a receiving leg, the upper of the two horizontal paths of each individual repeater, a sending leg, the lower of the two horizontal paths of each individual repeater, and a control circuit, the elements intermediate the two horizontal paths in each individual repeater. The receiving legs of all individual repeaters are connected together through a common point or hub, shown as a vertical line, designated receiving hub at the right of Fig. 1. The sending legs of all individual repeaters are also connected together through a common point or hub, designated sending hub at the right of Fig. 1. If regeneration is not required the receiving hubs and sending hubs are directly interconnected so that electrically all of the receiving legs and all of the sending legs may then be considered to be interconnected through a single common point or hub. If regeneration is required a regenerator is interconnected directly between the receiving and sending hubs. Each of the short horizontal spurs or straps connected to the receiving hub simulates the receiving leg of another individual repeater which may be connected to the hub. Similarly each of the short horizontal spurs or straps connected to the sending hub simulates the sending leg of another individual repeater which may be connected to the hub.

In Fig. 1, if a regenerative repeater is to be interconnected between the receiving and sending hub, switches 10 and 11 are actuated to engage contacts 12 and 13, respectively, so as to interconnect the regenerative repeater between the hubs. If no regenerative repeater is required switches 10 and 11 are actuated to engage contacts 14 and 15 so that in effect the receiving and sending hubs and all of the direct interconnections thereto constitute a single electrical point or hub.

Each of the individual repeaters has a receiving relay, relays 16, 17 and 18 in repeaters 1, 2 and 3, respectively, by means of which signals incoming from a connected line 4, 5 and 6, respectively, may be impressed on the associated receiving leg and through the leg to the hub and from the hub, either with or without regeneration, as required, on the individual sending legs and ultimately on the individual sending relays 19, 20 and 21, respectively, which impress them in turn on the outgoing lines 7, 8 and 9. This will be described in detail hereinafter.

When signals are received from any incoming line, they are repeated through the hub to all sending legs simultaneously. However, since it is important that incoming transmission signals should not be repeated by the sending relay in the same individual repeater from which they are being received, the control circuit in any individual repeater operates in response to the operation of its associated receiving relay in that repeater to prevent retransmission by the sending relay in the same repeater. How this is effected will now be explained.

The electromagnetic polar relays of the system per Fig. 1 are shown for the condition which they assume when the system is idle or marking. For this condition the armature of each of the receiving relays 16, 17 and 18 is in engagement with its respective right-hand or marking contact. Positive potential of uniform magnitude is impressed through resistances 73, 74 and 75, respectively, through each receiving leg which extends through rectifiers 22, 23 and 24, respectively, to the receiving hub 83. Positive potential of the same magnitude is impressed through the top winding of relay 82, in the regenerative repeater, through resistance 81, contact 13 and switch 11 to the receiving hub 83. No current flows in these circuits for this condition and the armature of relay 82 is actuated to engage with its marking contact, as shown, by the effect of biasing current flowing from positive battery through the bottom or biasing winding of relay 82 and through resistance 79 to ground. With the armature of relay 82 on its left-hand or marking contact, positive battery is impressed through resistance 81, left-hand or marking contact and armature of relay 82, contact 12, switch 10 and sending hub 84, through the sending leg of each individual repeater on a potentiometer in each leg formed by resistance 61 and grounded resistance 64, resistance 62 and grounded resistance 65, and resistance 63 and grounded resistance 66, respectively, in repeaters 1, 2 and 3, to the junctions of which pairs of resistances the cathodes of the sending triodes 31, 32 and 33, respectively, are connected in each sending leg. Positive battery is connected through the operating winding of a sending relay in each sending leg, relays 19, 20 and 21 in the sending leg of repeaters 1, 2 and 3, respectively, through resistances 58, 59 and 60, respectively, to the plate of sending triodes 31, 32 and 33, respectively. Due to the positive potential of their cathodes, triodes 31, 32 and 33 do not conduct when the system is in the idle or marking condition. Current flows from positive battery through the biasing windings of relays 19, 20 and 21 and resistances 67, 68 and 69, respectively, to ground and its effect, in the absence of current in the operating winding, actuates the associated armatures to engage their respective marking contacts 70, 71 and 72, as shown.

It will now be assumed that the armature of relay 18 in repeater 3 is actuated to engage with its left-hand or spacing contact. This makes receiving hub 83 negative. Current flows from positive battery through the top winding of relay 82, resistance 81, contact 13, switch 11, receiving hub 83, through rectifier 24, which is of low resistance for this condition, through the armature and spacing contact of relay 18 and resistance 78 to negative battery energizing the top winding of relay 82 and actuating its armature to engage its right-hand or spacing contact after the lapse of an interval of delay introduced by the regenerator, which delay is well understood in the art. After the delay interval, introduced by the regenerative repeater when used, negative potential is impressed through resistance 80 and the spacing contact and armature of relay 82 on the sending hub 84 and through the connected sending legs on the cathodes of sending triodes 31, 32 and 33. Because of the delay introduced by the regenerator, before the negative spacing potential is impressed on the cathode of each of triodes 31, 32 and 33, the negative potential on the receiving hub 83 is impressed on the potentiometers formed by the two resistances 34 and 37, 35 and 38 and 36 and 39, respectively, to the respective junctions of which resistances are connected the grids of triodes 28, 29 and 30, respectively. Each of the triodes is thereby cut off. Positive potential is connected through resistances 46, 47 and 48 to the plates of triodes 28, 29 and 30, respectively. As each triode is cut off the potential of its plate rises to its higher positive value. The plates of triodes 28, 29 and 30 are individually connected through resistances 43, 44 and 45, respectively, to the grids of triodes 25, 26 and 27, respectively, which are normally biased negatively from negative battery through resistances 40, 41 and 42, respectively. The potential of the grids of triodes 25, 26 and 27 is raised and two of the three triodes, namely, triodes 25 and 26 conduct.

Triode 27, however, is cut off since its plate is connected to negative battery through the spacing contact of relay 18 while the armature of each of relays 16 and 17 remains on its marking contact. The cathodes of triodes 25 and 26 are connected to ground through resistances 49 and 50, respectively, and are connected directly in parallel with the cathodes of triodes 28 and 29, respectively. They are also coupled through resistances 52 and 53, respectively, to the grids of sending triodes 31 and 32, respectively. Negative battery is connected through resistances 55 and 56, respectively, to the grids of triodes 31 and 32. When triodes 25 and 26 conduct their cathodes become more positive. The cathodes of triodes 28 and 29 and the grids of triodes 31 and 32 also become more positive and triodes 31 and 32 conduct when, after an interval, the negative spacing signal appears on their respective cathodes. Current flows through the operating windings of sending relays 19 and 20 actuating their respective armatures to spacing and sending a spacing signal out over lines 7 and 8.

In the case of repeater 3, since triode 27 is cut off, the potential of its cathode and of the grid of triode 33 remain negative. The spacing signal is not propagated through triode 33 and therefore relay 21 remains in the marking condition.

Attention is particularly called to the fact that although the grids of triodes 31 and 32 are conditioned almost instantly, in response to the negative spacing potential impressed on the receiving hub 83 through resistance 78 so that current would be passed through these triodes if their plates and cathodes were at proper potentials, their cathodes are not made negative with respect to their plates when a regenerative repeater is employed until after the delay interval has elapsed. Therefore, propagation of the spacing signal through these triodes is delayed. In the case of triode 33 the spacing signal is never propagated therethrough since its grid is made negative.

It will now be assumed that the armature of relay 18 is operated to reengage its marking contact. This makes the receiving hub 83 positive instantly and impresses a positive potential through resistances 34 and 37, 35 and 38 and 36 and 39 on their respective connected grids. After the delay interval, the regenerative repeater impresses a positive potential on the sending hub and on the cathodes of triodes 31, 32 and 33.

In the case of triodes 28 and 29 each of their cathodes is made so positive as a result of the conduction of its respective associated triode 25 and 26, respectively, in response to the preceding spacing signal, as described, that each of triodes 28 and 29 remains non-conducting and the respective associated triodes 25 and 26 remain conducting, so that the condition of the grid of each of triodes 31 and 32 remains unchanged as long as transmission from relay 18 continues. Positive potential is locked on these grids by the action of the flip-flop circuit. The transmission of a spacing signal element through them continues for an interval until after the delay interval of the regenerative repeater elapses. Then the armature of relay 82 is returned to marking which connects positive battery through resistance 81 to the cathodes of triodes 31 and 32, cutting them both off. As a result of this a spacing signal element transmitted by triodes 31 and 32 persists until a marking signal element actually appears on the sending hub and on the cathodes of triodes 31 and 32.

To anticipate, as long as relays 16 and 17 remain in the marking condition, once a spacing signal appears on the receiving hub from relay 18, the grids of triodes 31 and 32 become positive and remain positive as long as transmission of marking and spacing signal elements continues from relay 18. The grid of each of these triodes will continue positive until one or the other of relays 16 or 17 starts to transmit. Then in response to the first spacing signal element which relay 17, for instance, transmits toward the hub, the grid of its associated triode 32 will in turn be changed to and maintained negative to prevent transmission therethrough while the grid of triode 33 is made positive, assuming repeater 3 was the last to transmit toward the hub. The grids of all other triodes, such as 31, will remain locked positive so that they will all be in the conducting condition. This will be explained more fully hereinafter.

Assuming that relay 18 continues to transmit toward the hub, negative and positive spacing and marking signals are applied to the cathodes of triodes 31 and 32 from the sending hub, by way of the regenerative repeater when it is employed, or directly from the receiving hub through the sending hub when the switches 10 and 11 engage contacts 14 and 15. In response to this, triodes 31 and 32 will conduct and be cut off to propagate the signals.

In the case of repeater 3, the instant positive marking potential is applied through resistances 36 and 39 to the grid of triode 30, triode 30 conducts, its cathode being negative since triode 27 has been cut off. This lowers its plate potential and the potential of the grid of triode 27 which therefore remains cut off, so that the cathodes of triodes 27 and 30 and the grid of triode 33 remain negative. Therefore triode 33 remains cut off during transmission of marking and spacing signals from its associated receiving relay 18 notwithstanding the change in potential of the receiving and sending hub.

The control circuit in each individual repeater may be thought of as sensing the potential on each side of its associated rectifier, such as rectifier 22 in repeater 1. If a spacing signal exists on each side of the rectifier, which is the condition when any receiving relay, such as relay 16 in repeater 1, transmits a spacing signal, both of the triodes in the associated flip-flop circuit of repeater 1 are non-conducting. The triode such as triode 28 is non-conducting because of the negative spacing potential applied on its grid. The triode such as triode 25 is non-conducting notwithstanding its more positive grid potential because its plate is negative. Under this condition the grid of the triode such as 31 is negative and the triode is non-conducting. Then when the relay such as relay 16 in repeater 1 returns to marking, the positive marking condition on each side of the rectifier, such as rectifier 22, is ineffective to change the condition of the grid of the triode such as triode 31 because, although the triode such a triode 28 is made conducting, its lowered plate potential makes the grid of triode 25 more negative maintaining triode 25 cut off and maintaining the grid of the triode such as triode 31 negative, so no signals can be transmitted through the sending leg of a repeater, the associated receiving relay of which is transmitting toward the hub.

In order to transmit a spacing signal through the sending leg of a repeater it is necessary that its home receiving relay, such as relay 16, be marking in which case positive potential is impressed on the left-hand side of the rectifier such as 22, and a negative spacing potential, transmitted from a receiving relay in another repeater, must exist on the right-hand side of the rectifier. In such case the triode such as triode 28 is cut off, the triode such as triode 25 conducts and the potential of the cathodes of triodes 25 and 28 become positive, making the grid of the triode, such as triode 31, positive and making the triode conducting whenever the cathode of triode 31 is made negative. Once the cathode of the triode such as 28 is made positive, the triode is unaffected by subsequent positive marking signals applied to its grid by the receiving hub, and the positive condition of the grid of the triode such as 31 is maintained, while transmission continues. Every time a negative spacing signal element appears on the cathode of the triode, such as triode 31, the tube will conduct to transmit a spacing signal which actuates relay 19 to spacing. When a positive marking signal element appears on the cathode of the triode, such as triode 31, the tube will be cut off. Relay 19 will therefore be restored to marking by the effect of current in its biasing winding.

*Double space by-pass feature*

It is desirable, particularly in widespread half-duplex networks interconnected through several hub circuits at widely separated large centers, that an indication be provided when two subscribers send simultaneously. Of course, it is to be understood that it is not possible in many cases to send two effective messages simultaneously through half-duplex repeating points but it is desirable when such condition occurs that the incoming message be garbled as an indication that the condition prevails. This requires an arrangement different from one which would be effective simply to transmit a long spacing signal against transmission as a break signal. In large networks, which include several hubs, it is possible, unless what is known as a double space by-pass circuit is provided, to transmit a short message from say station A, while station B is transmitting through a distant hub in the network, and the short message from station A is never received and is not effective to mutilate the copy being received at distant stations as an indication that a simultaneous sending condition has existed. The reason for this is that the first space which appears at a half-duplex repeating point gets control and the second space becomes a mark during the overlapping period while they both exist simultaneously. Thus one of the simultaneously existing spacing signals is shorted. Each spacing signal element, say, in a short message which appears on a hub while another space exists as a portion of another message passing through the hub simultaneously will be shortened. As the short message is propagated through several hubs the remaining portions of the spaces are similarly shortened. The result is that after passing through several hubs all of the spacing signal elements in a short message tend to become marking. The marking signal elements remain marking. At remote stations the continuous marking signals produce no effect. Thus short messages are lost. A single long space which is continuously maintained as a breaking signal, however, will be propagated to the most distant stations.

In order to overcome the difficulty of lost short messages, a double space by-pass circuit has been provided heretofore as an adjunct to hub circuits particularly for use on large networks where the need for them obviously is greatest. Such circuits, as presently known, are arranged as separable units which are flexibly connected to the hub at such central repeating points as require them.

One of the features of the present invention, as mentioned above, is a double space by-pass circuit which is incorporated into the electronic control circuit. Figs. 2, 3 and 4 each includes electronic control circuits, the operation of which depends upon a flip-flop circuit, which control circuits incorporate therein a double space by-pass feature.

Figs. 2, 3 and 4, each of which shows a separate embodiment of the invention, each shows a single individual repeater connected to a hub. Each of Figs. 2, 3 and 4 is, in this respect, generally comparable to say individual repeater 1 and the hub in Fig. 1. Other individual repeaters will be connected to the hub in each instance as in the case of Fig. 1, but their illustration is not thought to be necessary to an understanding of the invention after the description of one such multi-repeater arrangement as Fig. 1. The sending and receiving hubs in each of Figs. 2, 3 and 4 may be interconnected directly or through a regenerative repeater as in Fig. 1. Each repeater in each of Figs. 2, 3 and 4 has a receiving leg, the upper horizontal branch and a sending leg the lower horizontal branch in each figure, each leg connected to the hub at the right of each figure. In Figs. 2 and 3 the receiving relay and the sending relay are illustrated, shown at the left of their respective legs in each instance. In Fig. 4 they are not illustrated. An electronic control circuit including a double space by-pass feature is shown intermediate the sending and receiving leg in each figure.

Refer now to Fig. 2.

In Fig. 2 the receiving relay R is connected to the receiving leg through resistance 100 and through the triode 101, which is arranged as a diode by having its grid and plate connected in parallel, to the receiving hub 105.

During an idle period and during the reception of a marking signal element the hub 105 is maintained at positive potential, such as plus 40 volts, through its connection to the junction between resistances 103 and 104 which are arranged as a potentiometer between positive battery 102 and ground. Positive battery 125, which may be for instance plus 130 volts, is impressed through marking contact 126 of receiving relay R and resistance 100 on the cathode of tube 101. The cathode of tube 101 is thus at a higher positive potential than the plate and the tube is therefore in the non-conducting condition during the idle or marking period. Negative battery, which may be for instance minus 130 volts, is impressed through spacing contact 127 of receiving relay R for the spacing condition, making tube 101 conducting and changing the potential of the receiving hub 105 to a negative potential, which may be for instance minus 40 volts. The receiving relay in each other individual repeater assumed to be connected to the receiving hub remains in the marking condition so that each associated receiving relay and its connected cathode circuit is effectively isolated from the hub by its non-conducting diode.

It is important, when transmission signals are incoming from a receiving relay in a particular repeater, that the sending leg in the same repeater be blocked and that the sending legs in all other repeaters be unblocked. In the case of the individual repeater which is assumed to be transmitting communication signals toward the hub, negative potential is impressed, during the first spacing interval, through resistance 106 on the grid of the left-hand portion of double triode 112, the grid being connected also through resistance 107 to negative battery 108 to center the swing on the grid characteristic. The left-hand triode of the tube 112 is cut off. The potential of the plate of the left-hand triode of tube 112, which is supplied from positive battery 109 through resistance 110, is made more positive and is impressed through resistance 160 on the grid of the left-hand triode of the double triode 136, which double triode is arranged as a direct-current multivibrator or flip-flop circuit. The grid of the left-hand triode of tube 136 is also connected to the receiving hub 105 through resistance 114 and to the plate of the right-hand triode of tube 136 through resistance 134, so that the left-hand triode of tube 136 is under joint control of these three influences. Negative battery through resistances 138 and 139 keeps the swings of each of the triodes of double triode 136 properly centered on the grid characteristic. For this condition the left-hand triode of tube 136 is conducting, the potential of the plate of the left-hand triode of tube 136 supplied from positive potential 131 through resistance 132 is lowered and applied through resistance 135 to the grid of the right-hand triode of double triode 136, and the right-hand triode is made non-conducting, raising its plate potential, which is supplied from positive battery 131 through resistance 133. The increased positive potential is applied through resistance 146 to the grid of triode 148. This maintains triode 148 conducting. This in turn lowers the plate potential of triode 148 which is supplied from positive battery through resistance 143. The lowered plate potential is in turn supplied through resistance 144 to the grid of tetrode 149 cutting it off. The grid of tetrode 149 is centered by negative battery through resistance 150. The screen of tetrode 149 is connected to the displaceable contact 154 of a variable resistance 153 connected between positive battery and ground, so that the output of the tube, when conducting, may be established at a current value equal to twice the uniform current through the biasing winding of sending relay 156. The effect of this current when flowing opposes the effect of the current in the biasing winding of relay 156. With tube 149 cut off, no current flows from positive battery through the operating winding of sending relay 156, the armature of which relay is maintained in engagement with its right-hand or marking contact under the influence of current from positive battery through its biasing winding and resistance 155 to ground. The negative spacing pulse applied to the input of tube 148 in the sending leg of the same individual repeater, in the receiving leg of which it originated, is ineffectual since the positive potential applied through resistance 146 is dominant.

When the armature of the receiving relay returns to its marking contact, the left-hand triode of double triode 112 conducts and its lowered plate potential is applied through resistance 160 to the grid of the left-hand triode of tube 136. However, the potential of the receiving hub 105 is made positive for marking and is applied through resistance 114 to the same grid. The effects neutralize one another. The raised positive potential of the right-hand triode of double triode 136 applied through resistance 134 to the left-hand grid of double triode 136 is effective to maintain the left-hand triode conducting and the right-hand triode therefore continues in the non-conducting condition to maintain the positive locking potential through resistance 146 on the grid of triode 148.

Therefore, once the positive locking potential is applied through resistance 146 on the grid of sending triode 148, it is maintained while transmission continues from the receiving relay of the same individual repeater and the sending relay, such as relay 156, is maintained in the marking condition throughout such transmission to prevent the signals from being transmitted back from the sending relay of the same individual repeater in which they are originating.

The manner in which ordinary transmission signals are transmitted by the sending relays of all individual repeaters other than the individual repeater in which they are originating will now be explained.

In the case of all individual repeaters other than the one in which the signals are originating, the receiving relays of all such repeaters will remain on their respective marking contacts. The left-hand triodes of all double triodes, such as double triode 112, in all such repeaters will conduct, lowering the potential impressed through resistances such as 160. In response to the first spacing signal element impressed on hub 105 the hub will go negative and impress a negative potential through the resistance such as resistance 114 in all such repeaters. The last preceding repeater which transmitted toward the hub will have a positive holding potential applied through the resistance such as resistance 134 from the plate of the right-hand triode of double triode 136 on the grid of its left-hand triode. This will be overcome by the potentials from the other two sources mentioned above and the left-hand triode in this particular repeater will be made non-conducting. In the case of the other repeaters, the right-hand triodes of the tube such as tube 136 will be conducting, so that a reduced positive potential will be impressed through the resistances such as resistance 134. The associated left-hand triodes of double triodes 136 in such repeaters will remain in the non-conducting condition. Thus the left-hand triode of double triode 136 in all repeaters other than that associated with the repeater which is now starting to transmit toward the receiving hub will be in the non-conducting condition and the associated right-hand triode of each will be conducting, lowering the potential impressed through resistance 146. This removes the block in each such sending leg. The sending triode 148 in each such sending leg will be made responsive therefore to the signals impressed thereon from the sending hub. For each negative sending impulse received from the sending hub, triode 148 in each such repeater will be cut off. This will effect the actuation of the armature of relay 156 in each such leg to engage its spacing contact in a manner which should be understood from the foregoing.

When two spacing signals appear simultaneously on receiving hub 105 its potential is made more negative, for instance minus 65 volts, by reason of the fact that when two receiving legs are connected in parallel between negative battery 160 assumed to be minus 130 volts and the receiving hub, the combined resistance of the legs and the potential drop therethrough is reduced. The grid of the right-hand triode of double triode 112 is connected to the receiving hub through resistance 113. The cathode of the right-hand triode of double triode 112, which is connected to junction 120 in the potentiometer formed by resistances 116 to 119, inclusive, connected between negative battery and ground is normally maintained at a potential of minus 50 volts, for instance, which is between the normal spacing potential of the hub of minus 40 volts and the double spacing potential of the hub of minus 65 volts. The right-hand triode of double triode 112 conducts for the marking condition and ordinary single spacing condition of the receiving hub 105. However, for the double space condition it is made non-conducting and the positive swing of its plate for this condition is impressed through resistance 141 on the grid of tetrode 149. The effect of this positive swing is made equal to the positive swing of the plate of triode 148 when a spacing signal is impressed on triode 148. Tetrode 149 therefore responds to a double space in the same manner as for a single space. However, the double space condition passes a space through tetrode 149 around the lock which is being applied to the triode such as triode 148 in the two individual repeaters in which the two spacing signals are originating and passes the space as well through all tetrodes corresponding to tetrode 149 in all receiving legs. Further, it is applied instantly in response to a double space. There is no delay tending to make each secondly appearing spacing signal element marking during the overlap period and there is no inversion. The result is that whenever two spaces appear simultaneously, a spacing signal is propagated instantly from the receiving hub through the right-hand triode of double triode 112 and through tetrode 149 to the sending relay in all individual repeaters, including the sending relays in the two repeaters from the receiving relays of which the signals are being simultaneously transmitted toward the hub and which sending relays would ordinarily be locked by the action of their respective flip-flop circuits. Attention is called to the fact that the spacing signals transmitted from the sending relays of the two repeaters which should be locked will each be equal in length to the overlap period of their existence on the hub. In the case of other repeaters the spacing signals will be lengthened because a spacing signal will start to be transmitted by such repeaters in the regular manner when the first spacing signal element appears. The spacing signal will be transmitted by means of the double space feature while the signal elements actually overlap or exist on the receiving hub simultaneously. Then the spacing signal, if one is present on the hub after the simultaneous spacing condition terminates, will be transmitted in the regular manner. It would be possible for instance to have the first two spacing signal elements of a train of three spacing signal elements in a particular multielement permutation signal combination pass through the hub before the first of a train of three others appears on the hub to interfere. The result would be the transmission of five successive spacing signal elements, and in general transmission is garbled as a result of the translation of multielement permutation code signal combinations defining particular letters or operational functions of the teletypewriter into other letters and/or functions. This serves at all receiving stations in the system as an indication of the simultaneous sending condition.

As may be understood from the foregoing, the double space by-pass feature is not required at all hub points particularly on single hub networks. It may be effectively cut out of circuit by actuating switch 129 to engage contact 130.

The double space by-pass feature is disabled when the control circuit is to be associated with a station loop repeater which is not equipped with a break feature. Disabling the double space by-pass feature causes the control circuit to provide a break feature, since a spacing signal outgoing from the loop will force a marking signal to be applied to the loop. The alternative to disabling the double space by-pass feature is to employ a loop repeater equipped with a break feature.

If desired the duration of double space spacing signal elements may be lengthened by connecting a condenser timing circuit comprising condenser 170, resistance 171 and switch 172 to terminal 173.

Refer now to Fig. 3 which resembles Fig. 2 in that it has substantially the same arrangement of receiving leg including the diode arranged triode 201 and the same transmission conditions on the leg and on the receiving hub for mark, space and double space conditions. It includes two triodes 202 and 203 instead of double triode 112. It has a flip-flop circuit comprising double triode 204 which resembles the flip-flop circuit in Fig. 2 and double triode 136, respectively. It has a triode 205 and a pentode 206 which generally resemble triode 148 and tetrode 149.

When the receiving relay R in Fig. 3 receives a spacing signal current flows through tube 201 causing the potential of the receiving hub to go negative. The other reeciving legs are prevented from acting as positive shunts on the R hub by the diode-connected tubes in them corresponding to tube 201. A negative potential on the receiving hub causes triode 203 to cut off. The positive swing of its plate potential is applied through resistance 207 to the grid of the right-hand triode of double triode 204 but its effect is overcome by the negative potential applied from the spacing contact of the receiving relay through resistance 208. Hence the grid of the right-hand triode of double triode 204 goes negative, cutting off its plate current and impressing an increased positive potential through resistance 209 on the grid of the left-hand triode of double triode 204. The positive swing of the plate of the right-hand triode is applied through resistance 210 on the grid of triode 205 in the sending leg overcoming the negative swing due to the spacing potential on the sending hub. This maintains triode 205 in the conducting condition, preventing the spacing signal from being transmitted through pentode 206 to the sending relay in the same repeater in which the spacing signal originated. The tube employed as tube 206 may, if preferred, be a beam power tube.

Triode 202 remains conducting during normal marking and spacing signals.

The two triodes of tube 204 and their interconnections are arranged as a flip-flop circuit. Once the right-hand triode of tube 204 is cut off, in response to the spacing signal, as described, its raised plate potential is supplied through resistance 209 to the grid of the left-hand triode of tube 204 activating the left-hand triode. The lowered plate potential of the left-hand triode is in turn applied through resistance 211 on the grid of the right-hand triode to serve as a lock thereon and to maintain the right-hand triode inactivated when relay R in the same repeater returns to marking and throughout the interval while relay R in the same repeater continues to transmit and until a corresponding relay R in some other repeater starts to transmit. In response to each marking signal element transmitted from relay R in the same repeater, positive potential will be impressed through resistance 208 on the grid of the right-hand triode of tube 204 but this positive potential will not be effective. The lowered plate potential of the conducting left-hand triode supplied through resistance 211 dominates the marking potential supplied through resistance 208 to maintain the right-hand triode in the cut-off condition. Then while transmission continues from receiving relay R in the same repeater, the sending leg will be locked in the marking condition.

When another repeater starts to transmit toward the hub its receiving relay will be actuated to spacing while all other receiving relays remain in the marking condition. Now, considering the individual repeater in Fig. 3 to simulate all repeaters in which the receiving relay remains marking while another individual repeater transmits toward the receiving hub, the receiving hub will become negative. Negative potential impressed through the resistances such as resistance 212 on the grids of all triodes such as triode 203 in such repeaters cuts off the triodes. The raised positive potential of their plates is impressed, through a resistance such as resistance 207 in each repeater, on the grid of the right-hand triode of a double triode such as double triode 204 making the right-hand triode conducting, lowering its plate potential and removing the lock from the sending triode 205 in the sending leg in each such repeater. The sending leg of each can therefore follow transmission signals impressed on the hub by the single repeater assumed to be sending.

When one individual repeater is transmitting toward the hub and a second sends a long space as a breaking signal or erroneously attempts to transmit a message and two spaces occur on the receiving hub simultaneously as a result, the potential of the receiving hub is made more negative, cutting off triode 202 in every repeater connected to the hub, raising its positive plate potential, which is applied to the grid of pentode 206, making the pentode in the sending leg of each repeater conducting. Thus, a spacing signal element is propagated through each sending relay whenever a double space condition exists on the hub. The spacing signal circumvents the flip-flop hold on sending triode 205 in the two repeaters which are transmitting toward the hub. Garbled signals will therefore be sent out by each sending leg connected to the hub as an indication of simultaneous sending. A long space will be sent out over each leg in response to a break signal.

Refer now to Fig. 4. This circuit is very similar to that of Fig. 3 and its method of operation the same except that when triode 302, which corresponds to triode 202 in Fig. 3, cuts off in response to a double space, the positive potential swing of its plate is applied to the grid of the right-hand triode of double triode 304, which corresponds to double triode 204 in Fig. 3, making all the right-hand triodes conducting, particularly the one formerly locked while its receiving relay was transmitting toward the hub, in turn removing the positive hold from the grid of its associated triode 305 which makes the associated triode 305 as well as all other triodes 305 responsive to spacing signals appearing on the sending hub. As a result spacing signals are propagated to all distant stations when simultaneous spacing signals occur due to attempted simultaneous transmission from two stations or due to a spacing break signal transmitted by a second station while another is transmitting.

The circuits of Figs. 3 and 4 are equally effective when no regenerative repeater is employed. When one is employed the circuit of Fig. 3 is preferable for the following reason. The spacing signal in passing through the regenerative repeater is subjected to the usual delay whereas the flip-flop control operates almost instantly. By the time the delayed spacing signal, due to a double space condition, has passed through the regenerative repeater the double space condition may no longer appear on the hub so that triode 302 will be no longer effective in removing the lock through the flip-flop tube on the sending triode in the two repeaters from which the incoming spaces are being received. Some of the double spaces, particularly overlapping single elements, will not pass through these individual repeaters. Overlapping trains of several elements and long spacing break signals however will pass. Therefore the circuit per Fig. 3 is preferable when a regenerator is employed.

What is claimed is:

1. In a telegraph system, at least two individual hub-type repeaters connected to a hub, individual telegraph signal transmission devices in said repeaters arranged to impress normal transmission signals on said hub at separate times, said system subject at times to the imposition of abnormal transmission signals from more than one of said repeaters simultaneously, instrumentalities in said repeaters for producing a distinguishable potential condition on said hub while said abnormal condition prevails, an individual double space by-pass circuit in each of said repeaters, a potential discriminating device in each of said circuits directly responsive to said potential condition, and a separate signal transmission control in each of said circuits for transmitting signals individually through each of said repeaters characterizing said abnormal condition.

2. A system in accordance with claim 1 including an electronic control circuit in each repeater, said control circuit having potential discriminating controls for normal transmission and in which system the double space by-pass circuit comprises an individual electronic device in each repeater arranged to circumvent the electronic control circuit in each repeater.

3. A system in accordance with claim 1, including an individual electronic control circuit interconnecting a receiving leg in each of said repeaters together with the hub to a first control in a sending leg in each repeater and in which said double space by-pass circuit in each repeater is interconnected between said hub and a second control in said sending leg more remote from said hub than said first control so as to dominate said first control.

4. In a telegraph repeater, two transmission paths, two electronic controls interconnecting said paths, one of said controls including a potential discriminating lock applicable between said legs to control normal transmission, said lock discriminating between normal communication potentials generated in said repeater and external to said repeater, the other of said controls including a potential discriminating circumvention of said lock, discriminating between normal communication potentials and another potential, to control the transmission of supervisory signals over said paths whatever the condition of said lock.

5. In a hub-type telegraph repeater, a single receiving lead over which incoming signals are transmitted toward the hub, means for impressing signals from the hub on said receiving lead, a directional control circuit in said repeater for controlling the transmission of normal communication signals from said repeater, a double space by-pass feature in said repeater for permitting two simultaneously existing spacing signals on said hub to pass one another, and direct connections between said single lead and said control and said by-pass feature.

6. A hub-type repeater having only two leads by means of which signals are transmitted toward and from the hub, a directional control circuit for controlling the transmission of normal communication signals from said repeater, a double space by-pass feature for permitting two simultaneously existing spacing signals on said hub to pass one another and a regenerative feature incorporable in said repeater, said directional control, said by-pass feature and said regenerative feature connected directly to said legs.

JAMES R. DAVEY.
WILTON T. REA.

REFERENCES CITED

The following references are of record in the file of this patent:

UNITED STATES PATENTS

| Number | Name | Date |
|---|---|---|
| 2,337,886 | Hanley | Dec. 28, 1943 |
| 2,347,813 | Cummings | May 2, 1944 |